March 10, 1953  R. L. KERR  2,630,920
COMBINATION STRAINER AND CHECK VALVE
Filed July 25, 1949

RALPH L. KERR
INVENTOR.

BY Lester B. Clark
& Ray L. Smith
ATTORNEYS

Patented Mar. 10, 1953

2,630,920

UNITED STATES PATENT OFFICE 2,630,920

COMBINATION STRAINER AND CHECK VALVE

Ralph L. Kerr, Columbus, Tex.

Application July 25, 1949, Serial No. 106,623

6 Claims. (Cl. 210—166)

This invention relates to a combination strainer and check valve for installation in lines carrying either particle-laden gaseous or liquid fluids.

It is an object of this invention to provide a combination strainer and check valve which may be easily installed and which has an easily removable strainer.

It is a further object of this invention to provide a device of this class in which the assembly serving as a strainer for fluid flow in one direction serves as a check valve against fluid flow from the other direction.

It is still another object of this invention to provide a device of this class in which a flexible cup collapses within a strainer to permit fluid passage therethrough from one direction and is forced outwardly to close the strainer against fluid flow therethrough from the other direction.

It is yet another object of this invention to provide a device of this class in which the plug opening may be tightly sealed when the strainer is in position in the valve seat.

Other and further objects of this invention will be obvious when the specification is considered in connection with the drawings, in which.

Figure 1:
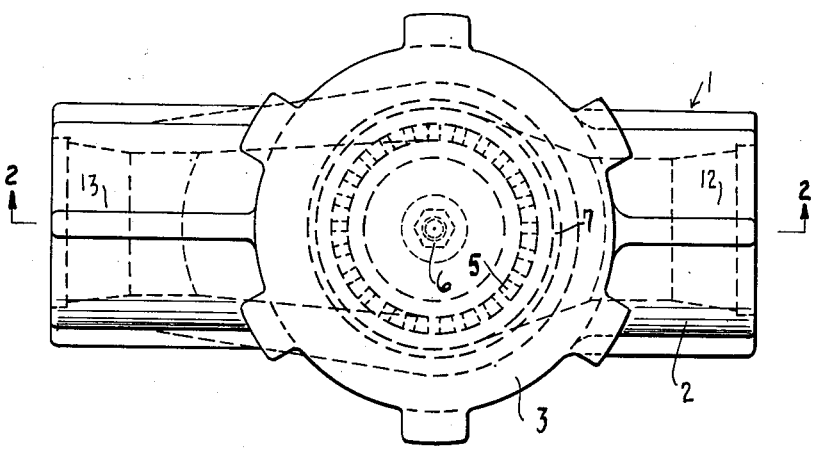
Figure 1 is a plan view of one modification of the combination check valve and strainer.
Figure 2:
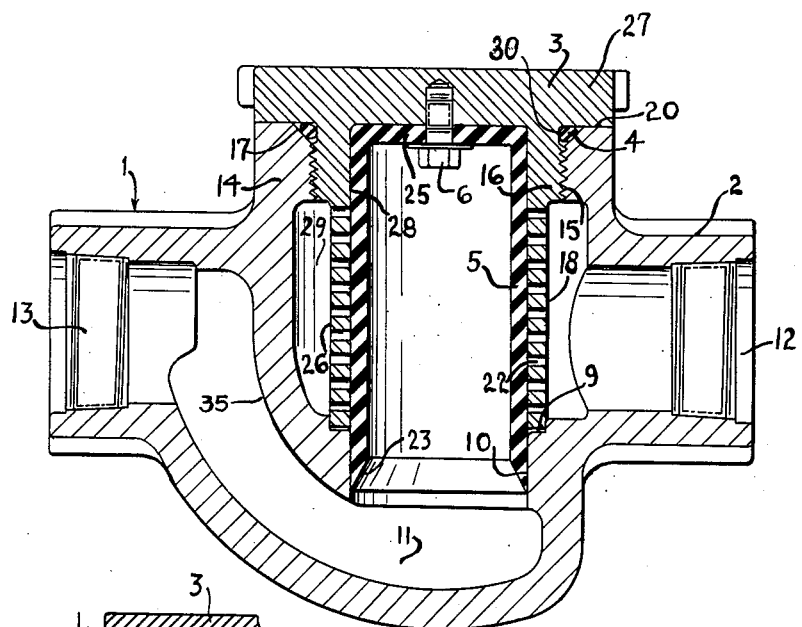
Fig. 2 is a sectional elevation, taken along line 2—2 of Figure 1.

In the modification of Figures 1 and 2 combination check valve and strainer 1 comprises a valve body 2, a plug 3, a sealing ring 4, a flexible cup 5, and a cap screw 6.

The valve body 2 has a flow passage therethrough which consists of inlet 12, central cavity 29, guide counter bore 9, seat bore 10, passage 11, and outlet 13. The valve body 2 has a head 14 having a threaded plug opening 15 therethrough with axis in coincidence with the axis of the seat bore 10 and counter bore 9. This body head 14 has a faced top 20 which is countersunk at 17 to provide a seat for the sealing ring 4, as will be hereinafter described.

When the plug 3 is in the opening 15 but the threaded portion 16 thereof is not yet threaded full up, the sealing ring 4, which extends around the turned-down portion 30 of the plug, extends axially from its contact with countersink 17 to a height above the faced top 20 of the valve body 2. Then final threading seats the cap portion 27 of the plug 3 on the faced top 20 to deform the sealing ring 4 into tightly sealing contact between the plug 3 and the countersunk portion 17 of the head 14. When this has been attained, the strainer section 18 which extends from the body of the plug 3, extends in close fitting sliding contact with the wall of the guide counterbore 9.

The collapsible rubber cup or flexible element 5 normally fits tightly within the strainer 18 to completely close all of the plurality of radially spaced holes or perforations 22 in the strainer, and the cup extends further downwardly into the seat bore 10 and upwardly so that the cup base 25 seats on the inside of the cap 27. The cap screw 6 passes centrally through the cup base 25 and is threaded into the cap portion 27 to firmly fix the cup to the plug.

As can readily be seen, it can be said that the guide counterbore 9 and seat bore 10 together constitute the valve seat of the valve, since the strainer, which serves a valve function, seats in the guide seat counterbore 9, and the cup, which also serves a valve function, seats in the seat bore 10.

In operation, gaseous or liquid fluids which may contain particles of substances to be strained or screened therefrom will flow through the inlet 12 upstream from the cup 5 and into the central cavity 29 which is sufficiently larger than the strainer or screen 18 to provide ample annular space therearound when the strainer is fitted into the seat counterbore 9. From the annular space 29 the fluid passes through the perforations 22, leaving substantially all the particles impinged on the outer peripheral surfaces 26 of the strainer 18. The pressure of the fluid in the perforations 22 will cause the flexible cup 5, of soft rubber or other similar substance, to collapse and thereby permit the strained fluid to flow downwardly and downstream from the cup 5 through the seat bore or port 10 in the wall 35 and on out through the passage 11 and the outlet 13.

In the case of back pressure building up from the direction of the outlet 13, the back flow of fluid through the passage 11 and up through the seat bore 10 will force the collapsed cup 5 outwardly into tight contact with the inner diameter 28 of the strainer 18 so that the perforations 22 will be firmly closed against the back flow of fluid therethrough.

It is a feature of this invention to provide a plug 3 which is easily removable through being readily unthreaded from the plug opening 15 in order that the strainer section 18 may be cleaned of impinged particles or in order that a new plug may be installed in case of deterioration of a plug or cup, as through corrosion.

Figure 3:
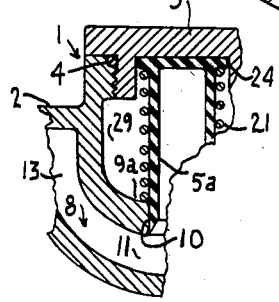
Fig. 3 is a sectional elevation through another modification of the device.

In the modification disclosed in Fig. 3, in which elements corresponding to elements of the modification hereinabove described will be assigned like reference numerals, a cup 5a is provided which is not fixed to the plug 3, but which is held thereagainst by the pressure of the strainer spring 21 against the under side of the cup base rim 24, the spring bearing on the valve seat surface 9a at its other end.

This modification requires a simpler plug structure and does not require the cap screw 6, by means of which the cup 5 is fixed to the plug 3. In this construction the threading of the plug 3 within the valve body 2 brings the peripheral surface of the end 23 of the cup 5a to slide in contact with the seat bore 9, thereby closing the flow passage.

It is herein pointed out that the invention is not limited to the modifications hereinabove disclosed but both types of cup construction may be employed with a modification wherein the outlet 13 extends co-axially with the seat bore 10 so that the inlet 12 forms the leg passage and the opening 15 and outlet 13 form the cross passage of a T.

It is also pointed out that this invention is not limited to the plug structure and seal specifically disclosed, but any structure is considered which can tightly seal the opening 15 when the cup element is in position in the flow passage. For instance an alternative construction may conceive of an unthreaded plug and opening, wherein the cap portion 27 is of a bolted flange construction having bolts passing therethrough into the head 14, and whereby the sealing is accomplished by a gasket fitting on the faced top 20.

Broadly this invention considers a valve structure which may carry out both the functions of a strainer and of a check valve.

What is claimed is:

1. In a valve, the combination of, a body providing an inlet passage thereinto and a central space inwardly of, and communicating with, said inlet passage, and also providing an annular opening through said body and spaced from said inlet to communicate with said central space, said body having a wall thereacross on the opposite side of said central space from said opening and also providing an outlet passage leading thereinto and extending to said wall and on the opposite side of said wall from said central space, said wall providing a port therethrough concentric with, and of smaller transverse cross-section than said opening to place said central space and said outlet passage in communication, said valve including a closure plug for said opening, an annular strainer providing open space means through the wall means thereof extending between said opening and said wall, a tubular, flexible, collapsible member of at least no greater outer diameter than the inside diameter of said strainer extending at either end beyond the open space means of said strainer, and means adapting said collapsible member to bear against said closure plug and adapted to bar fluid flow into the end of said collapsible tube adjacent said closure plug, said collapsible member collapsing responsive to pressure fluid flow into said body through said inlet as particles conveyed by said pressure fluid may be impinged upon said strainer, said collapsible member being forced radially outwardly to occlude said open space means responsive to pressure fluid flow into said body through said outlet.

2. In a valve, the combination of, a body providing an inlet passage thereinto and a central space inwardly of, and communicating with, said inlet passage, and also providing an annular opening through said body and spaced from said inlet to communicate with said central space, said body having a wall thereacross on the opposite side of said central space from said opening and also providing an outlet passage leading thereinto and extending to said wall and on the opposite side of said wall from said central space, said wall providing a port therethrough concentric with, and of smaller transverse cross-section than said opening to place said central space and said outlet passage in communication, said valve including a closure plug for said opening, an annular strainer providing open space means through the wall means thereof extending between said opening and said wall, a tubular, flexible, collapsible, cup member of at least no greater outer diameter than the inside diameter of said strainer extending at either end beyond the open space means of said strainer, and means adapting the closed end of said cup member to bear against said closure plug, said cup member collapsing responsive to pressure fluid flow into said body through said inlet as particles conveyed by said pressure fluid may be impinged upon said strainer, said cup member being forced radially outwardly to occlude said open space means responsive to pressure fluid flow into said body through said outlet.

3. In a valve, the combination of, a body providing an inlet passage thereinto and a central space inwardly of, and communicating with, said inlet passage, and also providing an annular opening through said body and spaced from said inlet to communicate with said central space, said body having a wall thereacross on the opposite side of said central space from said opening and also providing an outlet passage leading thereinto and extending to said wall and on the opposite side of said wall from said central space, said wall providing a port therethrough concentric with, and of smaller transverse cross-section than said opening to place said central space and said outlet passage in communication, said valve including a closure plug for said opening, an annular perforated strainer connected to said plug and extending between said opening and said wall, a tubular, flexible, collapsible cup member of at least no greater outer diameter than the inside diameter of said strainer extending at either end beyond the perforations of said strainer and into said port, and means connecting the closed end of said cup member to said closure plug, said cup member collapsing responsive to pressure fluid flow into said body through said inlet as particles conveyed by said pressure fluid may be impinged upon said strainer, said cup member being forced radially outwardly to occlude said open space means responsive to pressure fluid flow into said body through said outlet.

4. In a valve, the combination of, a body providing an inlet passage thereinto and a central space inwardly of, and communicating with, said inlet passage, and also providing an annular opening through said body and spaced from said inlet to communicate with said central space, said body having a wall thereacross on the opposite side of said central space from said opening and also providing an outlet passage leading thereinto and extending to said wall and on the opposite side of said wall from said central space, said wall providing a port therethrough concentric with, and of smaller transverse cross-section than said opening to place said central space and said outlet passage in communication, said valve including a closure plug for said opening, a tubular, flexible, collapsible cup member having a rim on the closed end thereof, a helical spring extending between said rim and said wall to force said rim against said closure plug, said cup member being of at least no greater outer tubular diameter than the inside diameter of said strainer, said collapsible member collapsing responsive to pressure fluid flow into said body through said inlet as particles conveyed by said pressure fluid may be impinged upon said strainer, said collapsible member being forced radially outwardly to occlude said open space means responsive to pressure fluid flow into said body through outlet.

5. In a valve, the combination of, a body providing an inlet passage thereinto and a central space inwardly of, and communicating with, said inlet passage, and also providing an annular opening through said body and spaced from said inlet to communicate with said central space, said body having a wall thereacross on the opposite side of said central space from said opening and also providing an outlet passage leading thereinto and extending to said wall on the opposite side of said wall from said central space, said wall providing a port therethrough concentric with, and of smaller transverse cross-section than said opening to place said central space and said outlet in communication, said valve including a closure plug for said opening, a flexible, tubular, collapsible cup having a rim on the closed end thereof, a helical spring strainer extending from said wall and against said rim to maintain said cup against said plug as the other end of said cup extends within said strainer and said port to normally occlude said strainer, said cup being collapsible to permit the flow of fluid from said inlet through said strainer and said port, and being forced outwardly by back pressure flow from said outlet to close said strainer against the passage of fluid therethrough.

6. In a valve, the combination of, a body providing an inlet passage thereinto and a central space inwardly of, and communicating with said inlet passage, and also an annular opening through said body and spaced from said inlet to communicate with said central space, said body having a wall thereacross on the opposite side of said central space from said opening and also having an outlet passage leading thereinto and extending to said wall on the opposite side of said wall from said central space, said wall providing a port therethrough concentric with, and of smaller transverse cross-section than said opening to place said central space and said outlet passage in communication, said valve including a closure plug for said opening, a tubular, flexible, collapsible cup having a rim on the closed end thereof, a helical spring strainer extending from said wall and against said rim to maintain said cup against said plug as the other end of said cup extends within said strainer and said port to normally occlude said strainer, said cup being collapsible to permit the flow of fluid from said inlet through said strainer and said port, and being forced outwardly by back pressure flow from said outlet to close said strainer against the passage of fluid therethrough.

RALPH L. KERR.

REFERENCES CITED

The following references are of record in the file of this patent:

UNITED STATES PATENTS

| Number | Name | Date |
|---|---|---|
| 209,525 | Tonkin | Oct. 29, 1878 |
| 675,711 | Brophy | June 4, 1901 |
| 1,927,582 | Denk | Sept. 19, 1933 |
| 2,236,477 | Fuchs | Mar. 25, 1941 |
| 2,466,304 | Cooney | Apr. 5, 1949 |